United States Patent [19]

Milholen

[11] Patent Number: 4,829,863

[45] Date of Patent: May 16, 1989

[54] HIGH-PRODUCTION INVERTER STACKER

[75] Inventor: William F. Milholen, Siler City, N.C.

[73] Assignee: Pearne, and Lacy Machine Company, Siler City, N.C.

[21] Appl. No.: 50,037

[22] Filed: May 15, 1987

[51] Int. Cl.$^4$ .................. B28B 11/14; B28B 15/00
[52] U.S. Cl. .............................. 83/23; 83/29; 83/86; 83/90; 414/791.4
[58] Field of Search .............. 83/23, 29, 86, 87, 90, 83/651.1, ; 414/33, 55, 56; 198/374, 422

[56] References Cited

U.S. PATENT DOCUMENTS

| Re. 28,160 | 9/1974 | Lingl |  |
|---|---|---|---|
| 3,474,917 | 10/1969 | Pearne et al. |  |
| 3,589,495 | 6/1971 | Pearne et al. | 198/33 |
| 4,173,910 | 11/1979 | Lineberry et al. | 83/29 |
| 4,211,130 | 7/1980 | Buckner et al. | 83/23 |
| 4,566,833 | 1/1986 | Gigante | 414/56 |

FOREIGN PATENT DOCUMENTS

772870 10/1980 U.S.S.R. .............................. 198/422

Primary Examiner—Frank T. Yost
Assistant Examiner—Hien H. Phan
Attorney, Agent, or Firm—Pearne, Gordon, McCoy & Granger

[57] ABSTRACT

An inverter/stacker for use in the manufacture of brick is disclosed in which two gripper frames are provided. Each gripper frame operates to grip slugs at a gripping position and to stack slugs at a stacking position in which the slugs are deposited on other slugs to form pairs of slugs, with one resting on the other. During the transfer, the slugs may be inverted for face-setting or stacked without facing. During each complete cycle of operation, each gripper frame grips transfers and stacks slugs so that higher outputs can be obtained without operating the inverter/stacker at high cyclic rates. In the illustrated embodiment, four slugs are stacked during each cycle of operation.

18 Claims, 5 Drawing Sheets

HIGH-PRODUCTION INVERTER STACKER

BACKGROUND OF THE INVENTION

This invention relates generally to machines for the manufacture of brick, and more particularly to a novel and improved inverter stacker.

PRIOR ART

Machines for manufacturing brick, usually referred to as "setting machines," are well known. Such machines are usually incorporated into a total automated system for forming brick and setting the brick on kiln cars in predetermined patterns. In such total systems, an extruder extrudes the green brick material onto an off-bearing belt which transports the slugs to the setting machine. At the setting machine, the slugs are sequentially pushed through wire cutters to form cut slugs consisting of a row of laterally abutting brick. From the cutters, the cut slugs are moved to an inverter and/or stacking mechanism which positions one slug upon another so as to form two-high stacks of slugs. The stacks of slugs are generally then moved to a spreading device, where the slugs are spread to provide spaces between adjacent pairs of brick within the row. A setting head is usually provided to then grip a large number of slugs and to transfer such slugs to a kiln car, or the like, where they are stacked in predetermined patterns for subsequent drying and firing. In some instances, the slugs are inverted prior to being positioned upon another slug, generally referred to as "face-setting," so that the face of the lower brick is covered by the face of the adjacent upper brick in the two-high stack. In other instances, the bricks are stacked without facing so that both brick in each pair of bricks are positioned face-up.

Variations of such machines are well known in which the stacking of the slugs occurs prior to cutting, and in such machines it is common to provide both face-setting and stacking without facing. Examples of such machines are illustrated in U. S. Pats. Nos. 3,589,495 and 3,474,917, both assigned to the assignee of the present invention, and both of such patents illustrate machines in which the stacking or inverting occurs prior to cutting.

U.S. Pat. Nos. Re 28,160; 4,173,910; and 4,211,130 also illustrate machines for stacking after cutting. In the latter-mentioned of such machines, a two-shelf elevator is provided in which slugs are positioned sequentially on the upper shelf and lower shelf for subsequent stacking operations. In the second-mentioned of such patents, an elevator system is provided for raising selected slugs up into an inverter gripper.

Generally, reliability of operation is improved and maintenance costs are reduced if the various components of a machine are operated at low cyclic rates. When this is done, the acceleration and deceleration of the various components are low, and wear and tear on the mechanism is minimized. However, slow cyclic rates reduce product output unless large numbers of brick are handled during each cycle of operation.

Characteristically, high production machines employ large setting heads which are capable of gripping and setting a very large number of brick during each cycle of operation. Therefore, high production rates can be achieved, even though the cyclic speed of the setting head is relatively slow.

Similarly, it has been common practice to provide inverters or stackers which handle two slugs during each cycle of operation. If, for example, each slug includes 32 brick, such stackers and/or inverters handle 64 brick during each cycle of their operation. In many cases, however, the maximum obtainable output of a total machine is limited by the maximum output rate of the inverter/stacker. For example, if an inverter/stacker is capable of reliable, satisfactory operation only if it operates through a complete cycle of operation every 15 seconds, and if such inverter/stacker can only invert 64 brick during each cycle of operation, the inverter can invert 15,360 brick per hour. Since only one-half the brick are inverted, the maximum total output of a machine incorporating such inverter is 30,720 brick per hour. This is true even if the other components of the machine are capable of sustaining reliable operation at higher output rates.

SUMMARY OF THE INVENTION

In accordance with the present invention, a novel and improved inverter/stacker is provided which is capable of handling a larger number of slugs during each complete cycle of its operation.

In the illustrated embodiments, the inverter/stacker is downstream of the cutter, and therefore handles cut slugs. However, as used herein, the term "slug" includes uncut slugs, cut slugs, and also rows of separate brick which may be formed, for example, by molding or the like.

In the illustrated embodiments, the inverter/stacker is provided with two gripper frames, each of which is sequentially operable to grip slugs at a pick-up position, to transfer such gripped slugs to a stacking position, and to release the gripped slugs at the stacking position on top of other slugs already positioned at such stacking position. The gripper frames are arranged and operated so that while one frame is gripping slugs at the pick-up position, the other frame is releasing and stacking slugs at the stacking position. Each frame functions during one complete cycle of the inverter/stacker to grip, transfer, and stack slugs. Therefore, slugs are stacked at least twice during each cycle of operation. Consequently, for a given machine, the gripper transfer can operate at slower cyclic speeds and still maintain high production rates.

For example, in the illustrated embodiment, each gripper is operable to grip two slugs during each transfer operation. Consequently, during each full cycle of the inverter/stacker, four slugs are inverted and stacked. As an example, for comparison to the examples set forth in the Background of the Invention above, a gripper transfer in accordance with the present invention handling slugs each containing 32 brick and operating with a cyclic speed of 24 seconds, is capable of inverting 19,200 brick per hour. Since only one-half of the brick are inverted, the total output of such inverted stacker is 38,400 brick per hour. Therefore, higher production rates are obtainable even though the cyclic rate of the inverter is substantially reduced. Of course, if the cyclic rate of the inverter is increased, or if the number of brick in each slug is increased, higher production rates are obtainable. Such high production rate can be obtained in a reliable manner without excessive machine wear because the grippers operate at a relatively slow cyclic rate, but handle a greater number of brick during each full cycle of operation.

In accordance with the first embodiment of this invention, the grippers function to face-set the slugs by inverting the slugs as they are transferred from the pick-up position to the stacking position. In accordance with the second embodiment, an inverter/stacker is provided which can selectively stack with facing or stack without facing.

Because the inverter/stacker in accordance with the present invention can handle a larger number of slugs during a given cycle of operation, high production rates are achieved without requiring very rapid operation of the inverter-stacker. Therefore, more reliable operation is achieved and wear and tear on the operating mechanism are drastically decreased.

These and other aspects of this invention are illustrated in the accompanying drawings, and are more fully described in the following specification.

BRIEF DESCRIPTION OF THE DRAWINGS

FIGS. 2a through 2i are schematic views of the inverter/stacker progressively illustrating the operation thereof.

DETAILED DESCRIPTION OF THE DRAWINGS

Figure 1:
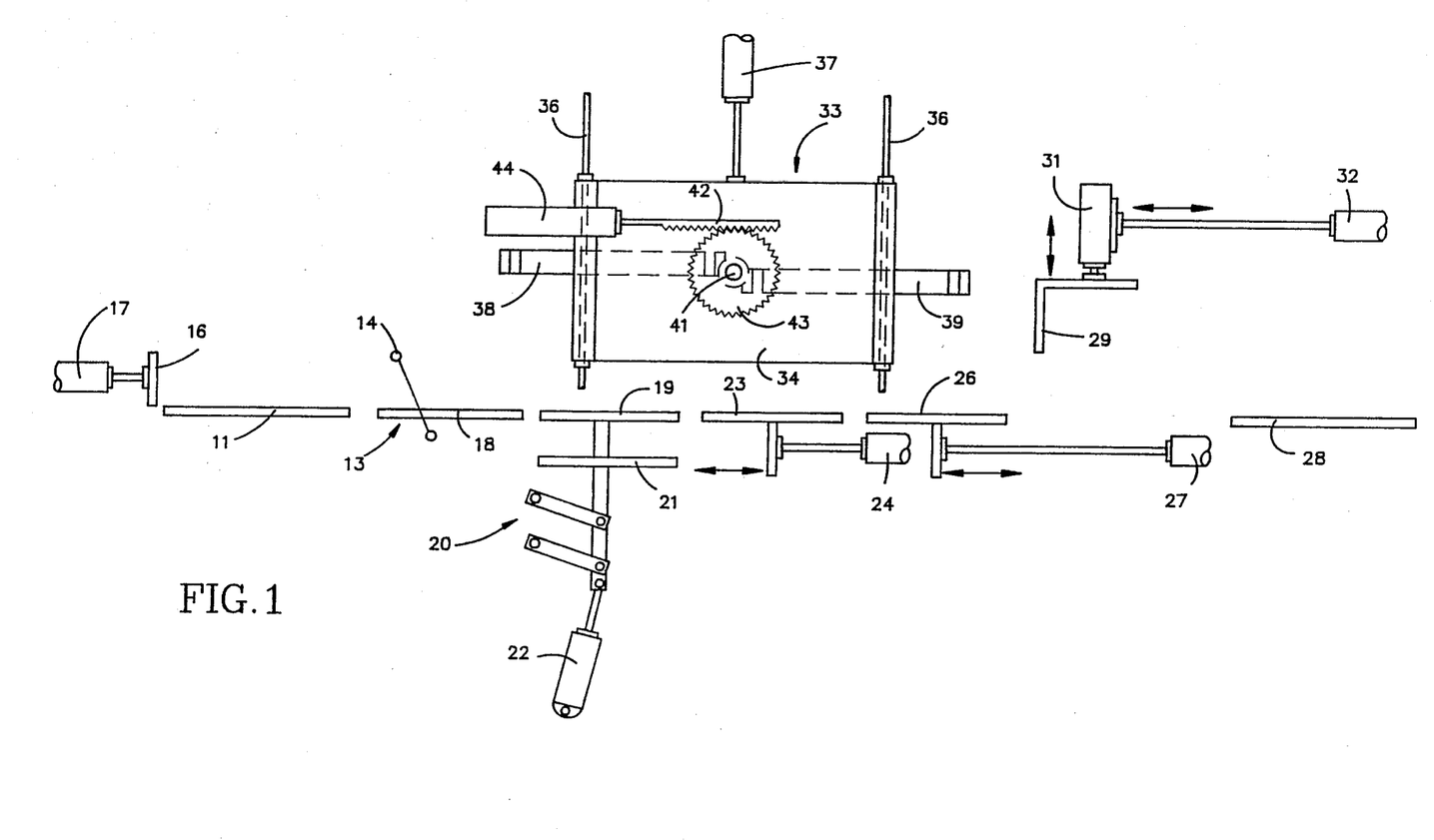
FIG. 1 is a schematic, side elevation of an inverter/stacker incorporating the present invention.

FIG. 1 schematically illustrates the principal portion of a setting machine incorporating an inverter/stacker in accordance with the present invention. Such machine includes a frame (not illustrated) on which the operative components of the machine are mounted. An off-bearing belt 11 transports elongated slugs from an extruder (not illustrated) to a cutting position 13 adjacent to a wire cutter frame 14 and cutter table 18. Located on the side of the off-bearing belt 11 opposite the cutter frame 14 is a pusher 16 powered by a piston and cylinder actuator 17 for reciprocating movement back and forth across the off-bearing belt.

Immediately downstream from the cutter table 18 is an elevator 20 providing an upper shelf 19 and a lower shelf 21. A piston and cylinder actuator 22 is connected to raise and lower the shelves 19 and 21 between a lowered position, in which the upper shelf 19 is aligned with the cutter table 18, and an upper position, in which the lower shelf 21 is aligned with the cutter table 18.

Downstream from the elevator is a first shuttle table 23 movable by a piston and cylinder actuator 24 back and forth between a position substantially adjacent to the elevator and a position spaced therefrom. Downstream from the first shuttle table 23 is a second shuttle table 26 movable by an actuator 27 to a position substantially adjacent to the first shuttle table 23, and a second position substantially adjacent to a marshaling table 28.

A puller 29 is vertically movable by a first actuator 31 and horizontally movable by a second actuator 32, and operates to pull stacked slugs from the second shuttle table 26 to the marshaling table 28 in a manner described below.

Mounted above the elevator is an inverter assembly 33 including a carriage 34 which is vertically movable along guide rods 36 by a piston and cylinder actuator 37. Mounted on the carriage 34 are a pair of gripper frames 38 and 39. The two gripper frames are supported on the carriage 34 for pivotal movement through 180 degrees about a central pivot axis 41. Such pivotal movement is produced by a rack 42 and pinion 43 drive operated by an actuator 44.

Each of the rectangular gripper frames includes pneumatically operated grippers, known to those skilled in the art, of the type illustrated in U.S. Pat. No. 4,211,130, and is operable to simultaneously grip two slugs for inversion and stacking operations.

Reference should now be made to the various FIGS. 2a through 2i, which sequentially illustrate the operation of the inverter/stacker at progressive positions as it performs its inverting and stacking operation.

Figure 2A:
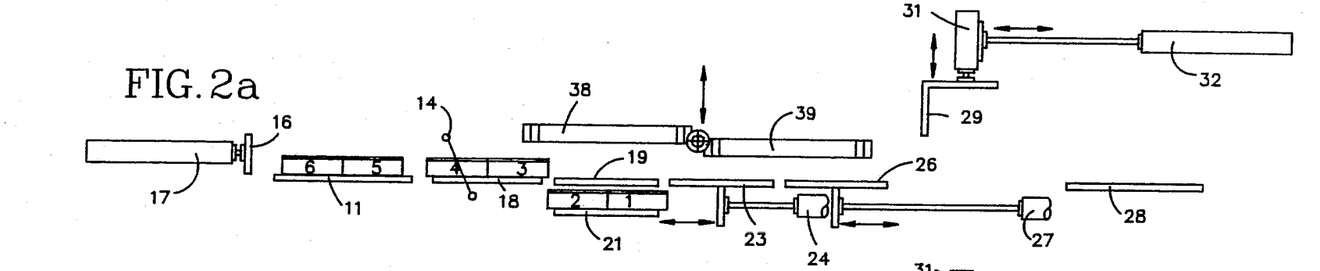

FIG. 2a illustrates the inverter/stacker at a point in its cycle of operation in which two slugs numbers 1 and 2 have been pushed by the pusher 16 from the off-bearing belt 11 through the cutter frame 14 and onto the lower shelf 21 of the elevator 20, and after such elevator has been operated by the actuator 22 to its lowered position, in which the upper shelf 19 of the elevator is in alignment with the cutter table 18.

The pusher 16 does not directly push the slugs onto the shelves 19 and 21 of the elevator 20 but, rather, pushes a pair of slugs 12 from the off-bearing belt onto the cutter table 18. During a subsequent pusher cycle, additional slugs 12 are pushed onto the cutter table 18, causing the slugs on the cutter table 18 to slide onto one of the shelves of the elevator.

Figure 2B:
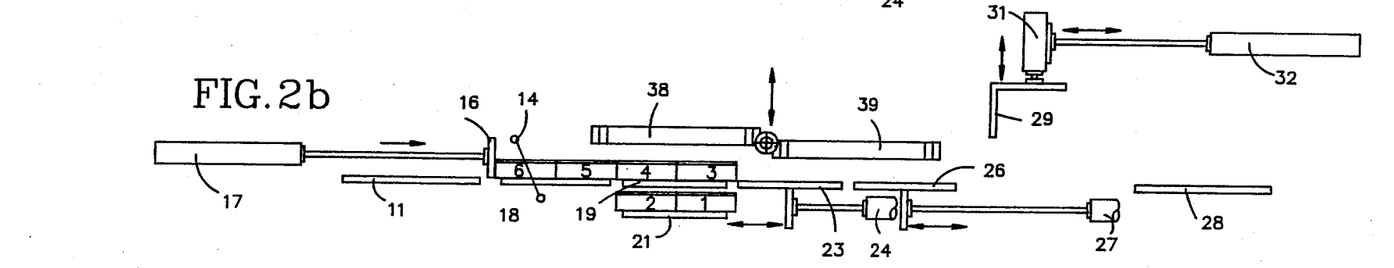

After the slugs numbers 1 and 2 have been positioned on the lower shelf 21 of the elevator, and the elevator has been lowered to position the upper shelf 19 in alignment with the cutter table 18, the pusher 16 operates and moves the slugs numbers 5 and 6 onto the cutter table 18. This, in turn, moves the slugs numbers 3 and 4 onto the upper shelf 19 of the elevator, as illustrated in FIG. 2b.

At this point in the machine cycle, both shelves of the elevator are loaded each supporting two cut slugs, namely the slugs numbers 1, 2, 3, and 4. At such point in time, the inverter assembly has moved the gripper frames to the position illustrated in FIG. 2b, in which the first gripper frame 38 is positioned immediately above the two slugs numbers 3 and 4 on the upper shelf 19.

Figure 2C:
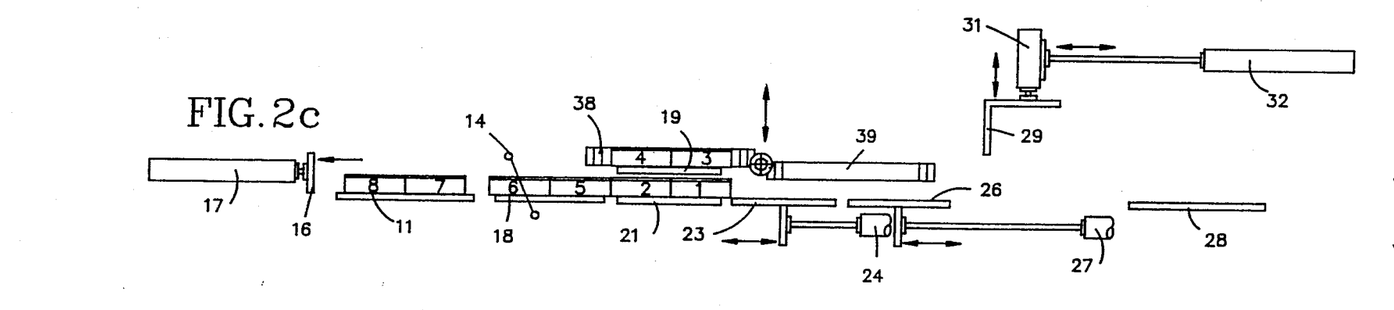

During the next step of operation, the elevator is raised to the position of FIG. 2c, and operates to position the two cut slugs numbers 3 and 4 in the first gripper frame 38. This same movement of the elevator moves the slugs numbers 1 and 2 on the lower shelf 21 of the elevator into alignment with the subsequent slugs numbers 5 and 6 resting on the cutter table 18. At this point in the cycle of the machine, the first gripper frame is operated to grip the two slugs numbers 3 and 4 and the carriage 34 commences to raise the two gripper frames. Simultaneously, the pusher 16 advances to move the slugs numbers 7 and 8 from the off-bearing belt 11 onto the cutter table 18. Such action causes the slugs numbers 5 and 6 to move from the cutter table 18 onto the lower shelf 21 of the elevator 20 and, in turn, moves the slugs numbers 1 and 2 from the lower shelf 19 of the elevator onto the first shuttle table 23. The first shuttle table 23 is positioned substantially adjacent to the elevator by its actuator 24, so that the slugs numbers 1 and 2 can move smoothly from the lower shelf 21 of the elevator onto the first shuttle table 23.

Figure 2D:
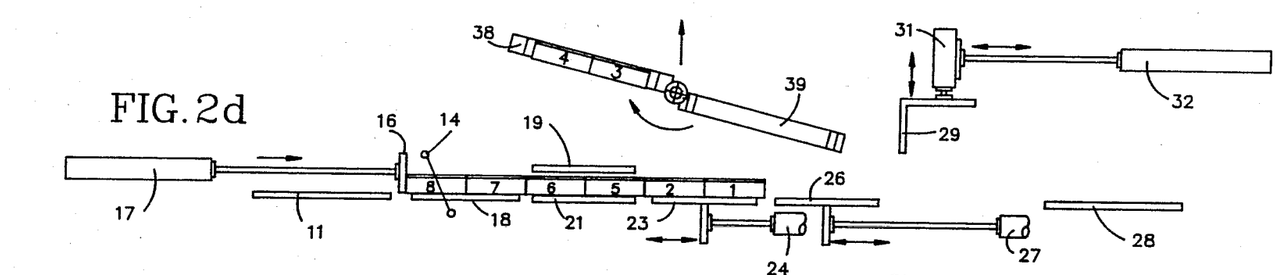

As the carriage rises, carrying the gripper frames 38 and 39 upwardly, the actuator 44 operates to commence rotation of the two gripper frames, as illustrated in FIG. 2d. While the carriage is raised, the two frames are rotated through 180 degrees to position the second gripper frame 39 over the elevator and the first frame 38 over the first shuttle table 23. During such rotation of the gripper frame, the elevator 20 is lowered from its raised position illustrated in FIG. 2d to align the upper shelf 19 with the cutter table 18 and the pusher is operated to move the slugs numbers 9 and 10 onto the cutter table, which in turn moves the slugs numbers 7 and 8 onto the upper shelf 19 of the elevator.

The elevator is then raised to position the slugs numbers 7 and 8 for gripping by the gripper 39, as illustrated in FIG. 2e. Also, between the position of FIG. 2d and the figure of FIG. 2e, the first shuttle table 23 is retracted by its actuator 24 to position the two slugs numbers 1 and 2 at the stacking position immediately below the first gripper frame which has been inverted through 180 degrees by rotation around the pivot axes 41. Therefore, in the position of FIG. 2e, the slugs numbers 3 and 4 are released by the gripper 38 onto the slugs numbers 2 and 1, respectively, and are positioned with their faces, represented by the double lines, in engagement with the faces of the slugs numbers 2 and 1. Therefore, the first two slugs numbers 3 and 4 have been face-set to form four slugs arranged in two vertically aligned stacks of two slugs each. Also, the gripper 39 at this point in the cycle of operation is operated to grip the slugs numbers 7 and 8, which have been raised by the elevator 20 into position for such gripping.

In the position of FIG. 2e, the inverter has operated through one-half of its full cycle of operation, and has delivered the first two slugs in the inverted position to the first shuttle table 23.

Figure 2F:
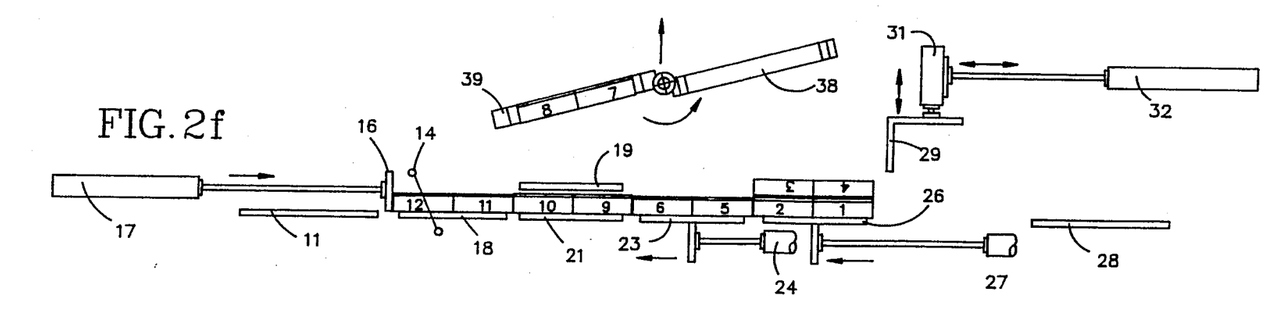
Figure 2G:
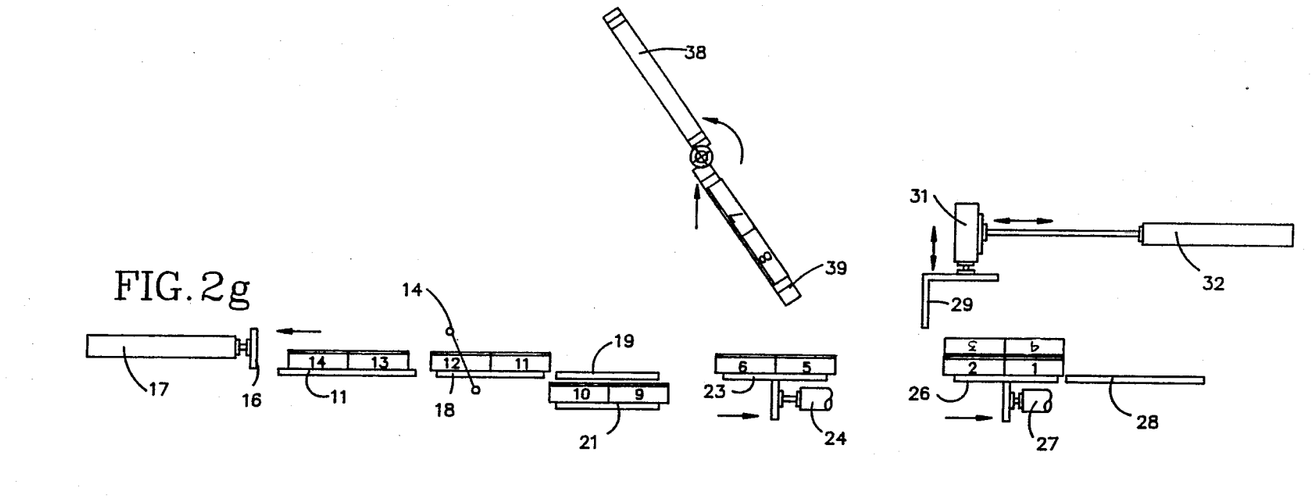

Thereafter, the gripper carrying the slugs numbers 7 and 8 is raised by the actuator 37 and commences to rotate in an anticlockwise direction while the pusher 16 advances to move the slugs numbers 11 and 12 from the off-bearing belt 11 onto the cutter table 18. This, in turn, moves the slugs numbers 9 and 10 from the cutter table 18 to the lower shelf 21 of the elevator and the slugs numbers 5 and 6 from the lower shelf of the elevator onto the first shuttle table 23. This also causes movement of the two-high stacks of slugs 1 through 4 from the first shuttle table 23 onto the second shuttle table 26, which has been, at this point in the cycle of operation of the machine, positioned adjacent to the first shuttle machine, positioned adjacent to the first shuttle table 23 by its actuator 27, as illustrated in FIG. 2f.

Figure 2H:
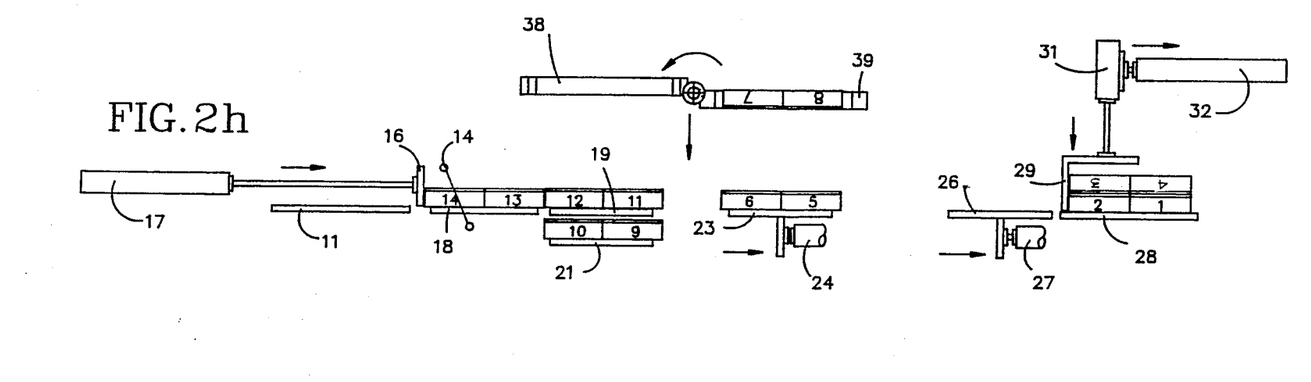
Figure 2I:
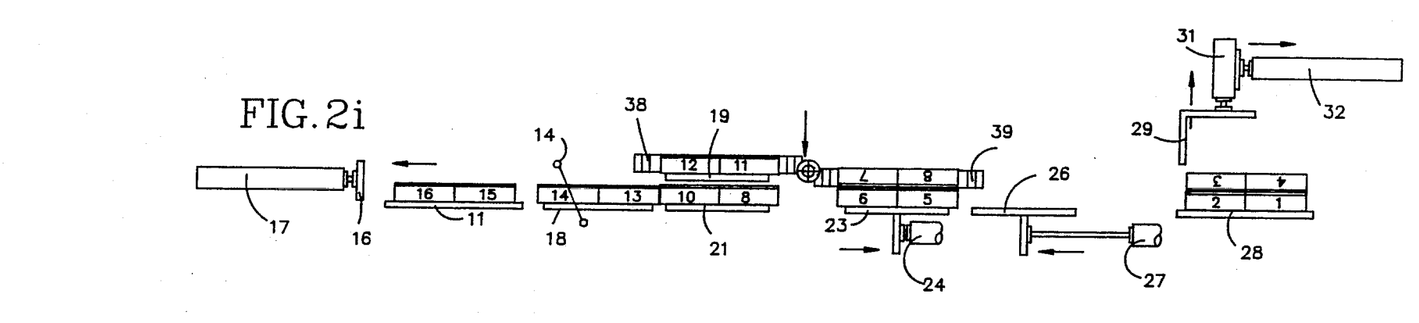

While the inverter is raised and is inverting the two slugs numbers 7 and 8, the elevator lowers to position the upper shelf 19 in alignment with the cutter table 18 and the pusher 16 operates to push the slugs numbers 13 and 14 from the off-bearing belt 11 onto the cutter table and to thereby load the slugs numbers 11 and 12 onto the upper shelf 19. While this is occurring, the two shuttle tables 23 and 26 are retracted to separate the slugs resting thereon. This results in the positioning of the slugs numbers 5 and 6 below the gripper frame 39, and positions the slugs numbers 1 through 4 adjacent to the marshaling table 28 so that the puller 29 can operate to slide the slugs from the second shuttle table 26 onto such marshaling table, as illustrated in FIG. 2h. The gripper frames are then lowered so that the slugs numbers 7 and 8 gripped by the second gripper 39 are positioned on the slugs numbers 5 and 6, resting on the first shuttle table 23, as illustrated in FIG. 2i. At the same time, the first gripper 38 grips the two slugs numbers 11 and 12 resting on the upper shelf 19 to commence the second full cycle of operation.

Because two slugs are inverted and stacked during each half-cycle of operation, a total of four slugs are inverted during each full cycle of operation, and a total of eight slugs are handled during each full cycle of operation. Therefore, the inverter can operate at relatively slow operating speeds and still produce high output.

In this illustrated embodiment, each of the gripper frames is sized to simultaneously handle two slugs each containing 32 brick, and operate through a full cycle every 24 seconds. Therefore, even though the inverter is operating at a relatively slow cyclic speed, for example, a 24-second cycle, at which reliable operation occurs with minimum maintenance or breakdown, a production rate of 38,400 brick per hour results.

In the illustrated embodiment, in which two slugs are positioned side by side on the off-bearing belt for simultaneous movement from the off-bearing belt to the cutter table, the pusher must operate through a full cycle four times during each cycle of operation of the inverter. Therefore, the pusher operates with a 6-second cyclic rate. If, on the other hand, the off-bearing belt were selected to provide only a single slug for movement into the cutter during each pusher operation, the pusher would then have to operate with a 3-second cycle.

With this invention, the inverter need not operate rapidly, and therefore does not have to provide rapid acceleration and deceleration. Consequently, much longer service life can be obtained without significant maintenance and reliable operation is achieved even though high production rates are provided.

Figure 3:
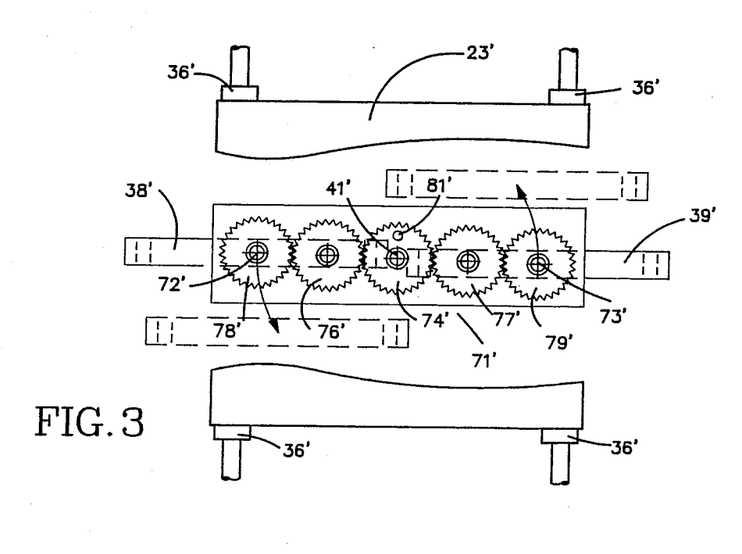
FIG. 3 is a schematic, side elevation of a second embodiment inverter/stacker which is operable to face-set and also to stack without facing.

FIG. 3 illustrates a second embodiment of an inverter/stacker incorporating the present invention, in which the mechanism can be selectively operated to either face-set or to stack without facing. In such embodiment, similar reference numerals are used to designate similar parts; however, a prime is added to indicate reference to the second embodiment.

The inverter/stacker is again provided with a vertically movable carriage 23' guided by vertically extending rods 36'. Mounted on the carriage 23' is a frame support 71' which is rotatable relative to the carriage back and forth through 180 degrees about a pivot axis 41'.

The two gripper frames 38' and 39' are journaled on the frame support 71' for relative rotation about pivot axes 72' and 73'. The frame support 71' is powered by a rack and pinion drive and an actuator (not illustrated in FIG. 3) of the same type as that illustrated in connection with the first embodiment.

A central gear 74' is mounted on the support frame 71' on the axis 41', and meshes with a pair of similar but opposite idler gears 76' and 77' which are journaled on the support frame 71'. The idler gear 76' meshes with a gear 78' connected to the gripper frame 38' and a similar gear 79' meshes with the idler gear 77' and is connected to the frame 39' by a connection which prevents relative rotation therebetween. In the illustrated embodiment, all of the gears 74', 76', 77', 78', and 79' are equal in size.

When it is desired to operate the inverter/stacker for face-setting, a pin 81' or other suitable fastener is installed to lock the central gear 74' against rotation relative to the frame support 71'. In such condition, the two gripper frames are locked against rotation relative to the support 71', and when the support 71' is rotated through 180 degrees, each of the frames 38' and 39' also rotates through 180 degrees. In such condition, the operation of the inverter/stacker of FIG. 3 is identical to the operation of the inverter/stacker of the embodiments of FIGS. 1 through 2i.

When stacking without facing is desired, however, the pin 81' is reinstalled in a position in which it locks the central gear 74' against rotation relative to the carriage 23'. In such condition, rotation of the support through 180 degrees operates to move the frames back and forth between the pick-up and delivery positions, but the frames are held against rotation. Therefore, in such operating condition, the slugs carried by the respective frame 38' and 39' are not turned over, but are transferred from the pick-up position to the delivery position without being inverted. Here again, the overall operation of the machine is substantially identical to the first embodiment, but in such operating condition, the slugs are not inverted and the stacking is accomplished without facing.

If desired, the machine in accordance with the first embodiment of the invention can also be combined with a stacking system similar to the stacking system disclosed in U.S. Pat. No. 4,173,910 when stacking without facing is desired. In such a combination, the gripper frames are used only when face-setting is desired and the gripper frame is immobilized when stacking without facing is desired and a stacker of the type illustrated in such patent is employed during such stacking without facing operation.

Although the preferred embodiments of the invention have been shown and described, it should be understood that various modifications and rearrangements of the parts may be resorted to without departing from the scope of the invention as disclosed and claimed herein.

What is claimed is:

1. A method of stacking brick comprising:
    separately positioning first slugs at a pick-up position and second slugs at a stacking position spaced from said pick-up position;
    providing at least a pair of grippers each operable to:
    (a) grip some of said first slugs at said pick-up position;
    (b) move said some of said first slugs to said stacking position; and
    (c) release said some of said first slugs on said second slugs at said stacking position; and
    operating said grippers through repeated cycles so that one gripper is in said pick-up position gripping said some of said first slugs while the other of said grippers is in said stacking position positioning others of said first slugs on said second slugs, and so that both of said grippers deliver first slugs to said stacking position during each cycle of operation, and moving said second slugs to said stacking position without being gripped by said grippers so that stacks of slugs are produced in which a substantial number of the slugs in said stacks are not transferred by said grippers.

2. A method of stacking brick as set forth in claim 1, including operating each of said grippers to simultaneously grip a plurality of said first slugs so that at least four slugs are stacked during each cycle of said grippers.

3. A method of stacking brick as set forth in claim 1, including inverting said grippers while gripping said first slugs so that said first slugs are face-set.

4. A method of stacking brick as set forth in claim 1, including holding said grippers against rotation so that said first slugs are stacked without facing.

5. A method of stacking brick as set forth in claim 1, including rotating said grippers for inverting said slugs for face-setting and holding said grippers against rotation for stacking without facing.

6. A method of stacking brick as set forth in claim 1, including elevating selected slugs in said pick-up position.

7. A method of stacking brick as set forth in claim 1, including separating a supply of slugs and moving some of said slugs to said pick-up position and others of said slugs to said stacking position without passing through said gripping position.

8. A brick stacker comprising transfer means operable to divide a supply of slugs into first slugs delivered to a gripping position and second slugs delivered to a stacking position, first and second grippers operable through cycles of operation in which each gripper grips said first slugs at said gripping position and stacks said first slugs on said second slugs at said stacking position, one of said grippers being positioned at said gripping position while the other of said grippers is positioned at said stacking position, both of said grippers operating to stack slugs during each cycle of operation thereof, said transfer means operating to deliver said second slugs to said stacking position without being gripped by said gripping means so that stacks of slugs are formed at said stacking position in which only a portion of the slugs therein are gripped by said grippers.

9. A brick stacker as set forth in claim 8, wherein said grippers are operable to face-set slugs at said stacking position.

10. A brick stacker as set forth in claim 8, wherein said grippers are mounted on a vertically movable carriage which raises said grippers clear of said gripping position and sais stacking position as said grippers move therebetween and which lowers said grippers to said gripping position and said stacking position after they move therebetween.

11. A brick stacker as set forth in claim 10, wherein said grippers are mounted on said carriage for pivotal movement relative thereto through 180 degrees.

12. A brick stacker as set forth in claim 11, wherein said transfer means includes an elevator having two shelves, said elevator being operable to raise said first slugs to said gripping position.

13. A brick stacker as set forth in claim 8, wherein each gripper is operable to grip and stack a plurality of slugs during each cycle of operation.

14. A brick stacker as set forth in claim 8, wherein said transfer means includes a cutter operable to cut slugs into individual brick.

15. A brick stacker as set forth in claim 14, wherein each gripper is operable during each cycle to grip and stack a plurality of slugs.

16. A brick stacker as set forth in claim 15, wherein said grippers invert said slugs and face-set said slugs at said stacking position.

17. A brick stacker as set forth in claim 15, wherein said grippers are selectively operable to stack without facing and to face-set said slugs.

18. A brick stacker as set forth in claim 15, wherein said grippers are operable to grip and stack cut slugs.

* * * * *

UNITED STATES PATENT AND TRADEMARK OFFICE
CERTIFICATE OF CORRECTION

PATENT NO. : 4,829,863

DATED : May 16, 1989

INVENTOR(S) : William F. Milholen

It is certified that error appears in the above-identified patent and that said Letters Patent is hereby corrected as shown below:

Column 5, line 46 "machine, positioned adjacent to the first shuttle" should be deleted.

Column 8, line 38 "sais" should be --said--.

Column 8, line 55 "14" should be --8--.

Signed and Sealed this

Sixth Day of February, 1990

Attest:

JEFFREY M. SAMUELS

Attesting Officer    Acting Commissioner of Patents and Trademarks